(12) United States Patent
McCray et al.

(10) Patent No.: US 10,671,813 B2
(45) Date of Patent: Jun. 2, 2020

(54) PERFORMING ACTIONS BASED ON DETERMINED INTENT OF MESSAGES

(71) Applicant: Nuance Communications, Inc., Burlington, MA (US)

(72) Inventors: Donni McCray, Burlington, MA (US); Brian Yee, Burlington, MA (US); David Kay, Burlington, MA (US); Aaron Sheedy, Burlington, MA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 375 days.

(21) Appl. No.: 15/167,028

(22) Filed: May 27, 2016

(65) Prior Publication Data

US 2017/0346769 A1 Nov. 30, 2017

(51) Int. Cl.
*G06F 3/048* (2013.01)
*G06F 40/30* (2020.01)
*H04L 12/58* (2006.01)

(52) U.S. Cl.
CPC ............ *G06F 40/30* (2020.01); *H04L 51/04* (2013.01); *H04L 51/26* (2013.01); *H04L 51/16* (2013.01)

(58) Field of Classification Search
CPC .................... G06F 17/20–28; H04L 51/046
See application file for complete search history.

(56) References Cited

U.S. PATENT DOCUMENTS

| | | | |
|---|---|---|---|
| 9,436,755 B1* | 9/2016 | Subramanya | G06F 17/30598 |
| 9,787,822 B1* | 10/2017 | Holland | H04M 1/72566 |
| 2008/0174570 A1* | 7/2008 | Jobs | G06F 3/0488 |
| | | | 345/173 |
| 2013/0110940 A1* | 5/2013 | Pasquero | H04M 1/72552 |
| | | | 709/206 |
| 2016/0342900 A1* | 11/2016 | Allen | G06F 17/3043 |

* cited by examiner

*Primary Examiner* — Claudia Dragoescu
(74) *Attorney, Agent, or Firm* — Onello & Mello, LLP

(57) ABSTRACT

Systems and methods are described herein for performing actions based on a determined intent within messages received by a mobile device. In some embodiments, the systems and methods may access a message received by a mobile application (e.g., text messaging application, chat application, and so on) of the mobile device, analyze the message to determine an intent of the message (e.g., whether the message includes a request or a task for a recipient of the message), and perform an action based on the determined intent (e.g., set a reminder when the message includes a task for the recipient). Further details are described herein.

18 Claims, 5 Drawing Sheets

PERFORMING ACTIONS BASED ON DETERMINED INTENT OF MESSAGES

BACKGROUND

Mobile electronic devices (such as smart phones, personal digital assistants, computer tablets, smart watches, and so on) are ubiquitous. Mobile devices provide advanced computing capabilities and services to users, such as voice communications, text and other messaging communications, video and other multimedia communications, streaming services, and so on. Often, users, via their mobile devices, access such services as customers or subscribers of telecommunications carriers, which provide telecommunications networks within which the users make voice calls, send text messages, send and receive data, and otherwise communicate with one another.

Currently, there are various different services that attempt to manage and simplify the many different ways in which users communicate via applications provided by their mobile devices. For example, calendar applications may include reminder or task lists, various third party applications (e.g., applications downloaded to a mobile device), may provide specific or targeted services to manage email communications, messaging communications, and the communication applications themselves may assist users with sorting, searching, and other interaction functionalities within the applications.

BRIEF DESCRIPTION OF THE DRAWINGS

Embodiments of the present technology will be described and explained through the use of the accompanying drawings.

Figure 1:
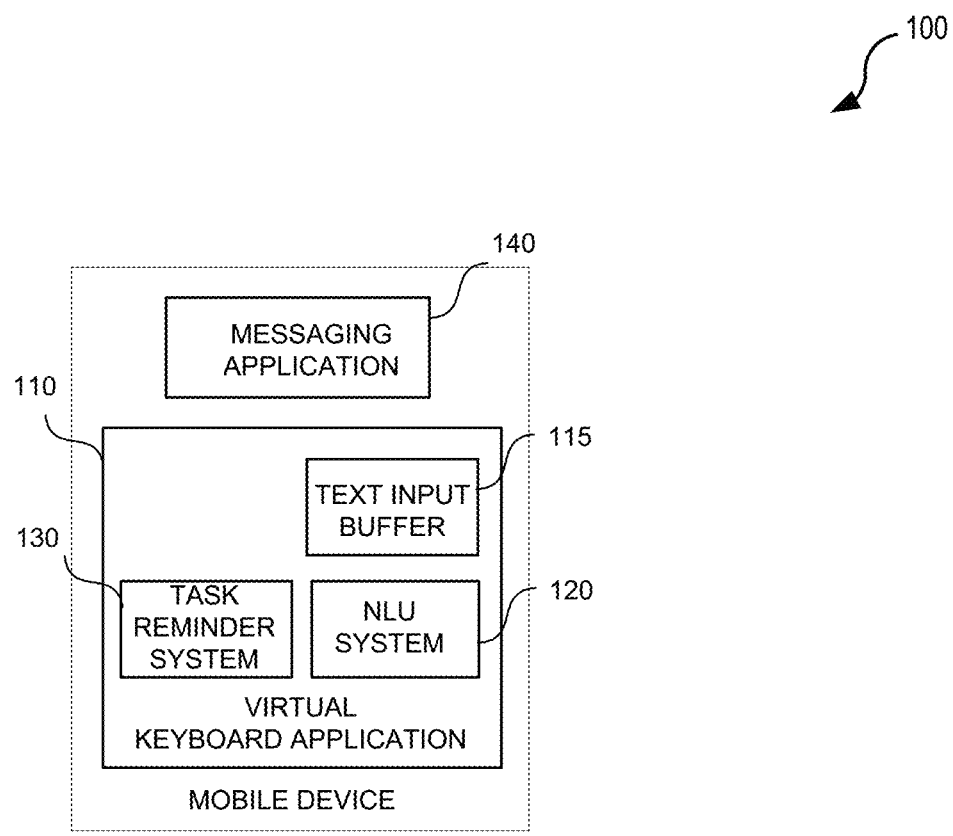
FIG. 1 is a block diagram illustrating a suitable computing environment within which to perform actions based on a determined intent within messages.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for performing actions based on a determined intent within messages received by a mobile device. In some embodiments, the systems and methods may access a message received by a mobile application (e.g., text messaging application, chat application, and so on) of the mobile device, analyze the message to determine an intent of the message (e.g., whether the message includes a request or a task for a recipient of the message), and perform an action based on the determined intent (e.g., set a reminder when the message includes a task for the recipient).

In some embodiments, the systems and methods may access a message received by a messaging application and/or stored by a text input buffer of a keyboard application supported by a mobile device, determine at least a portion of message is associated with a request or task, and perform an action based on determining the portion of the message is associated with the request.

In some embodiments, the systems and methods may access a string of text received by an application of an mobile device, classify the string of text as a task or request (e.g., after performing a semantic or natural language analysis of the string of text), and perform an action that is based on classifying the string of text as a task or request.

For example, a soccer fan receives a chat message from her friend (also a fan) about a soccer game they are going to later that weekend. The message is "Can you print the tickets to the game?" The fan will not have access to a printer until later in the day, and, therefore, cannot print the tickets upon receiving the message. Using the systems and methods described herein, her mobile device, via a virtual keyboard application used with the chat application, analyzes the message and determines, based on a natural language understanding (NLU) of the message, that the message includes a request from the sender to the fan. Based on determining that the message includes a request, the virtual keyboard application causes a display of a graphical element associated with setting a reminder for the fan to fulfill the request at a later time. Later that day, the fan views her reminders, sees the message, and prints the tickets.

Therefore, in some embodiments, the systems and methods enable the setting of reminders or other actions on behalf of users when the user receive messages and other communications having contents determined to be tasks or requests given to the users by the senders of the messages. Such functionality may provide users with automatic or guided management of the many messages they receive via their mobile devices, facilitating the retention and recall of actionable messages that require attention after the messages are received, among other benefits.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

Examples of Suitable Computing Environments

As described herein, in some embodiments, the systems and methods facilitate the automatic or user-selected setting of reminders and other actions upon users receiving messages and other communications via their mobile devices that include requests, tasks, questions, actionable items, or other language intended to cause the users to act (e.g., perform a task) at a later time. FIG. 1 is a block diagram illustrating a suitable computing environment within which to perform actions based on a determined intent within messages.

The computing environment may include or be supported by a mobile device 100 or other computing device, such as a mobile or smart phone, tablet computer, laptop, mobile media device, mobile gaming device, vehicle-based computer, wearable computing device, and so on), to access various services (e.g., voice, message, and/or data services) supported by a telecommunications network (not shown)

that is provided by a telecommunications (wireless) carrier and/or a wireless network (not shown).

The mobile device 100 includes a virtual keyboard application 110. The virtual keyboard application 110 may include an input layer or component configured to receive input (e.g., user-provided input) and produce a text string within a text input buffer 115.

The virtual keyboard application 110 may interact with various applications supported by the mobile device 100, such as one or more messaging applications 140 (e.g., text messaging applications, email applications, chat applications, instant messaging applications, social network service applications, and so on), that facilitate the exchange of text-based communications between users, such as senders of messages and recipients of messages.

The keyboard is a useful place to add functionality. Typically, the keyboard is a layer of software that is often or always accessible when using a computing or mobile device and its various applications. Therefore, adding other functionality within or associated with a keyboard would provide many benefits, such as easy or simple navigation between applications on a device, enhanced user interface capabilities, and other benefits. For example, the keyboard may act as an information exchange medium, enabling users to access data residing on their device or in locations to which their device communicates, exchange that information with applications or other programs running on the device, and parse the information in order to perform various actions based on the contents of the messages, as described herein.

The virtual keyboard application 110 may also include components/functionality of typical keyboard applications, such as components that may provide a text input functionality, a key tap functionality, a swipe, gesture, and/or contact movement functionality, or any other functionality that facilitates the reception of text-based input from a user. The components may cause the mobile device 100 to display a keyboard via a touch-screen, and receive input via a displayed keyboard presented via the touch-screen. The keyboard may be a virtual keyboard, such as any keyboard that is implemented on a touch-sensitive surface, a keyboard presented on a touch-sensitive display, a keyboard imprinted on a touch-sensitive surface, and so on. Example keyboards include a keyboard displayed on a monitor, a keyboard displayed on a touch-screen, a keyboard optically projected onto a flat or curved surface, and so on. In some cases, the keyboard may be "virtually" touched, such as a screen or projection that is controlled with some sort of pointer device or gesture recognizer.

In some embodiments, the virtual keyboard application 110 may perform recognition and/or disambiguation techniques to entered text when a user is inputting text, in order to assist users with entering text via small or complex displayed keys or keyboards.

In some embodiments, the virtual keyboard application 110 may include a natural language understanding (NLU) system 120, which attempts to classify and identify or determine an intent within contents of messages received by the messaging application 140 and accessed by the virtual keyboard application 110. The NLU system 120 may utilize various semantic or other natural language analyses when determining an intent of the contents of a message. The NLU system 120 may classify messages with a variety of different classifications, in order to generate and present automated responses to messages. For example, the NLU system 120 may classify a message as being a question for the recipient, and generate a "yes" automated response and a "no" automated response.

The NLU system 120 may utilize a variety of techniques when classifying or otherwise determining intent for contents of messages and other strings of text. In some cases, the NLU system 120 may parse the messages and identify keywords associated with classifications. For example, the NLU system 120 may identify certain keywords (or, punctuation) typical of questions (e.g., "can," "will," "would," "please"), and determine the message is likely a request or task given to a recipient.

In some cases, the NLU system 120 may analyze the syntax or structure of the message, as well as other messages (e.g., previous messages) within a thread of messages, when determining intent or classifying messages (or portions thereof). For example, the NLU system 120 may analyze a message string of: Sender—"hey, I have a favor to ask"; Recipient—"you want me to get the kids from school, right?"; Sender—"yes, I am stuck at work"; and determine a task was given to the recipient based on contents of the thread of messages.

The NLU system 120 may classify messages based on a continued machine learning of a user's (and associated users) writing patterns and language tendencies. For example, the NLU system 120 may initially or at a first time classify a message of "get out of here, please" as a task for a specific user, and then, by learning a user's language patterns, determine the user is merely typing an often used expression.

As described herein, the virtual keyboard application 130 also includes a task reminder system 130, which performs actions associated with messages that are assigned classifications (e.g., by the NLU system 12) associated with requests, tasks, or other intended acts to be performed by a user associated with the mobile device 100.

Although shown in FIG. 1 as being integrated with the virtual keyboard application 110, the task reminder system 130 may be implemented as part of the messaging application 140, as a stand-alone application within the operating system of the mobile device 100, and do on. Also, the task reminder system 130, in some embodiments, may include various components of the NLU system 120, and may be integrated with the NLU system 120 as one combined system that parses messages to determine intent from the contents of the messages, and performs actions based on the determined intent. Further details regarding the task reminder system 130 are described herein.

FIG. 1 and the discussion herein provide a brief, general description of a suitable computing environment in which the systems and methods can be supported and implemented. Although not required, aspects of the task reminder system 130 (and, NLU system 120) are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the mobile device 100 may include network communication components that enable the mobile device 100 to communicate with remote servers or other portable electronic devices by transmitting and receiving wireless signals using a licensed, semi-licensed, or unlicensed spectrum over communications network, such as network. In some cases, the communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EG-PRS)), Enhanced Data rates for GSM Evolution (EDGE), Universal Mobile Telecommunications System (UMTS), or Long Term Evolution (LTE) network), or other communications network.

Those skilled in the art will appreciate that various other components may be included in the mobile device 100 to enable network communication. For example, the mobile device 100 may be configured to communicate over a GSM or newer mobile telecommunications network. As a result, the mobile device 100 may include a Subscriber Identity Module (SIM) card that stores an International Mobile Subscriber Identity (IMSI) number that is used to identify the mobile device 100 on the GSM mobile or other communications networks, for example, those employing 3G and/or 4G wireless protocols. If the mobile device 100 is configured to communicate over another communications network, the mobile device 100 may include other components that enable it to be identified on the other communications networks.

In some embodiments, the mobile device 100 may include components that enable them to connect to a communications network using Generic Access Network (GAN), Unlicensed Mobile Access (UMA), or LTE-U standards and protocols. For example, the mobile device 100 may include components that support Internet Protocol (IP)-based communication over a Wireless Local Area Network (WLAN) and components that enable communication with the telecommunications network over the IP-based WLAN. Further, while not shown, the mobile device 100 may include capabilities for permitting communications with satellites. The mobile device 100 may include one or more mobile applications that transfer data or check-in with remote servers and other networked components and devices.

Further details regarding the operation and implementation of the task reminder system 130, will now be described.

Examples of Performing Actions Based on Determined Intent of Messages

Figure 2:
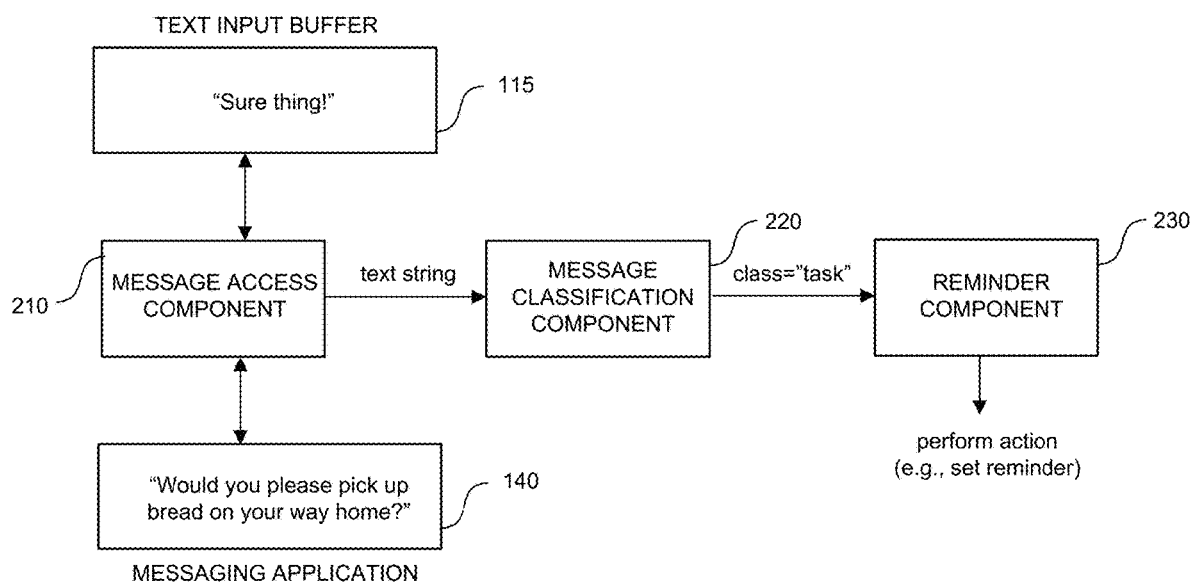
FIG. 2 is a block diagram illustrating components of a task reminder system.

The task reminder system 130, as described herein, is configured to perform actions associated with a determined intent within message contents. FIG. 2 is a block diagram illustrating components of the task reminder system 130. The task reminder system 130 may include functional modules that are implemented with a combination of software (e.g., executable instructions, or computer code) and hardware (e.g., at least a memory and processor). Accordingly, as used herein, in some examples, a module is a processor-implemented module and represents a computing device having a processor that is at least temporarily configured and/or programmed by executable instructions stored in memory to perform one or more of the particular functions that are described herein. For example, the task reminder system 130 may include a message access component 210, a message classification component 220, and a reminder component 230.

In some embodiments, the message access component 210 is configured and/or programmed to access messages received by a messaging application and/or stored by a text input buffer of the keyboard application supported by the mobile device and associated with the messaging application. For example, the message access component 210 may access a message received by the message application 140, such as a message of "Would you please pick up bread on your way home?", which interacts with the virtual keyboard application 110. Also, the message access component 210 may access a composed user reply message of "Sure thing!" within the text input buffer 115.

In some embodiments, the message classification component 220 is configured and/or programmed to assign one or more natural language classifiers to the messages received by the messaging application and/or stored by the text input buffer of the keyboard application, based on semantic analyses of the messages. For example, the message classification component 220 may parse the text string of the received message, identify one or more keywords or syntactical phrases that are associated with an intent or other purpose of the message, and assign one or more classifiers to the text string.

In some cases, the message classification component 220 may receive the classification information from the NLU system 120, which performs a semantic or natural language analysis of a message, and assigns a classifier to the message based on the analysis. Therefore, the task reminder system 130 may include various NLU components and/or interact with the NLU system 120 when parsing and analyzing messages and other text strings in order to determine an intent of the message.

Following the example above, the message classification component 220 (or, the NLU system 120), may identify certain keywords (shown as underlined) in the example message:

Would you please pick up bread on your way home?, where the keywords are determined to be associated with an intent of a task or request given to a recipient of the message by a sender of the message.

As described herein, the assigned classifiers may be any classifiers utilized by the task reminder system 130 and/or the NLU system 120 in order to perform actions in response to certain message (or, certain contents within the messages). For example, the following table, which may be stored by the task reminder system 130 (or, the NLU system 120), provides example relationships between assigned classifiers and performed actions:

TABLE 1

| Classifier | Action to be Performed |
|---|---|
| "task" | Cause reminder icon to be displayed by keyboard application |
| "request" | Cause reminder icon to be displayed by keyboard application |
| "question" | Generate automated responses |
| "greeting" | No action |

In some embodiments, the reminder component 230 is configured and/or programmed to cause the keyboard application to perform an action of setting a reminder for accessed messages that are assigned one or more natural language classifiers associated with tasks or requests. For example, the reminder component 230 may access a table similar to Table 1, and, when a message is assigned a classification of "task," perform an action of causing a user-selectable reminder icon to be displayed by the virtual keyboard application 110.

The reminder component 230 may perform a variety of different actions in order to set reminders or otherwise inform a user of the mobile device 100 about tasks or requests. Example actions include:

displaying a user interface element that, when selected by a user of the mobile device 100, causes the mobile device 100 to launch an application (e.g., calendar or task application) associated with setting a reminder on behalf of the user that is associated with the request;

automatically displaying a user interface element associated with setting a reminder on behalf of the user that is associated with the request;

causing the keyboard application to render, present, or display a user interface element that, when selected by a user of the mobile device, causes the mobile device to display the message to the user, such as at a later time; and so on.

Figure 3:
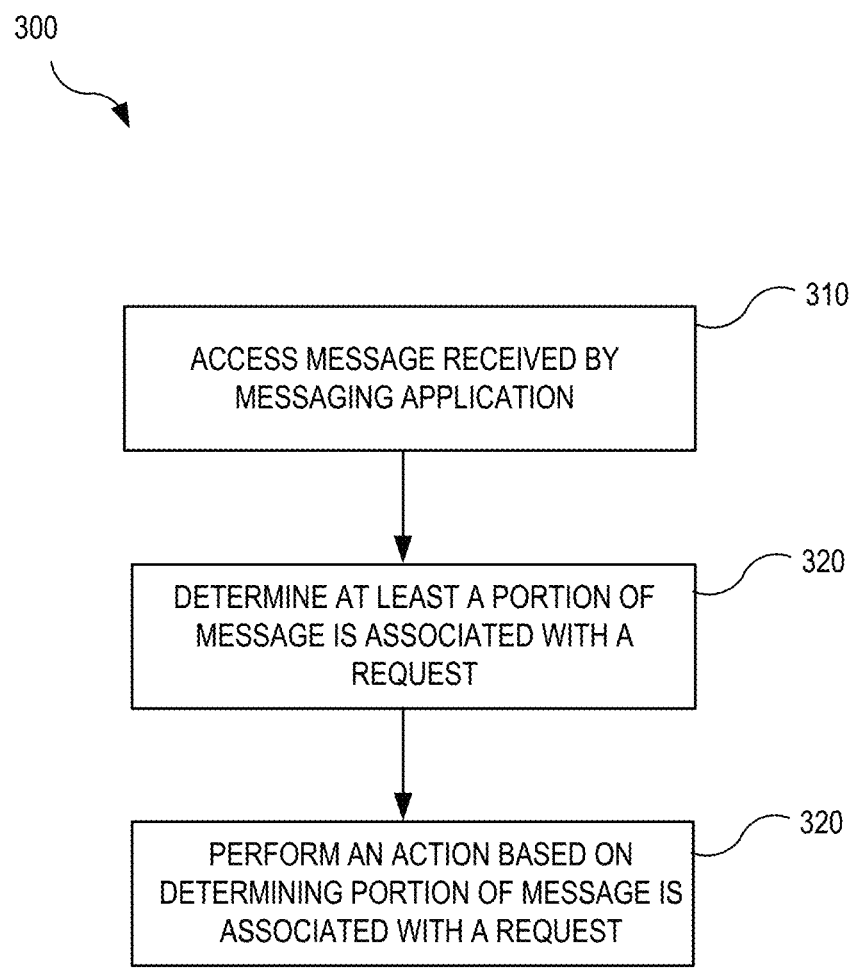
FIG. 3 is a flow diagram illustrating a method for performing an action based on determining a received message includes a task or request.

As described herein, the task reminder system 130 performs various processes, routines, or algorithms when performing actions based on determining intent within messages received at the mobile device 100. FIG. 3 is a flow diagram illustrating a method 300 for performing an action based on determining a received message includes a task or request. The method 300 may be performed by the task reminder system 130 and, accordingly, is described herein merely by way of reference thereto. It will be appreciated that the method 300 may be performed on any suitable hardware.

In operation 310, the task reminder system 130 accesses a message, such as a message received by the message application 140, which interacts with the virtual keyboard application 110, and/or a message within the text input buffer that is being composed by a user.

In operation 320, the task reminder system 130 determines at least a portion of message is associated with a request. For example, the message classification component 220 may parse the text string of the received message, identify one or more keywords or syntactical phrases that are associated with an intent or other purpose of the message, and assign one or more classifiers to the text string.

In operation 330, the task reminder system 130 performs an action based on determining the portion of the message is associated with the request. For example, the reminder component 230 may access a table similar to Table 1, and, when a message is assigned a classification of "task," perform an action of causing a user-selectable reminder icon to be displayed by the virtual keyboard application 110.

In some embodiments, the task reminder system 130 may utilize additional information before performing an action based on a determined intent of a message. The task reminder system 130 may receive an indication that a recipient of the message has replied to the message using one or more automated messages (e.g., "yes," or "sure") or user input messages (e.g., "yep," or "okay") that may be classified as confirming or accepting a task or request implicit in the received messaged.

For example, the NLU system 120 may generate multiple responses to the request, wherein at least one of the generated responses is a response associated with an acceptance of the request by a user of the mobile device and display the generated responses to the user of the mobile device via the virtual keyboard application 110. The task reminder system 130 may receive a selection (or, indication of a selection) of the response associated with an acceptance of the request by the user of the mobile device, and perform the action based on determining the portion of the message is associated with the request and based on the selection of the response associated with the acceptance of the request by a user of the mobile device. Thus, the task reminder system 130 may perform the action when a first message is classified as a "task," and a reply message is classified as an "acceptance" of the task.

Figure 4A:
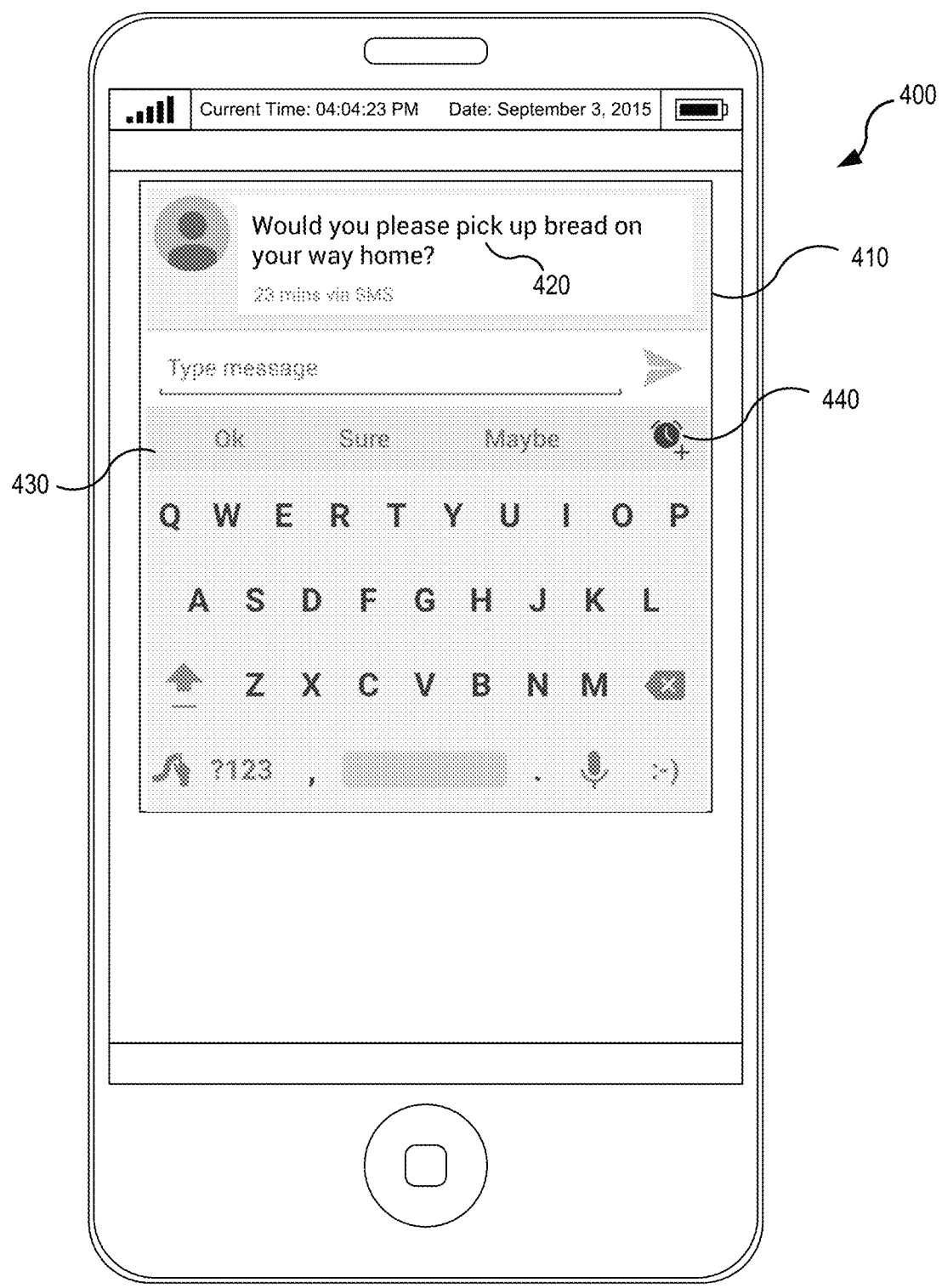
FIGS. 4A to 4B are display diagrams illustrating example user interfaces presented by a mobile device.
Figure 4B:
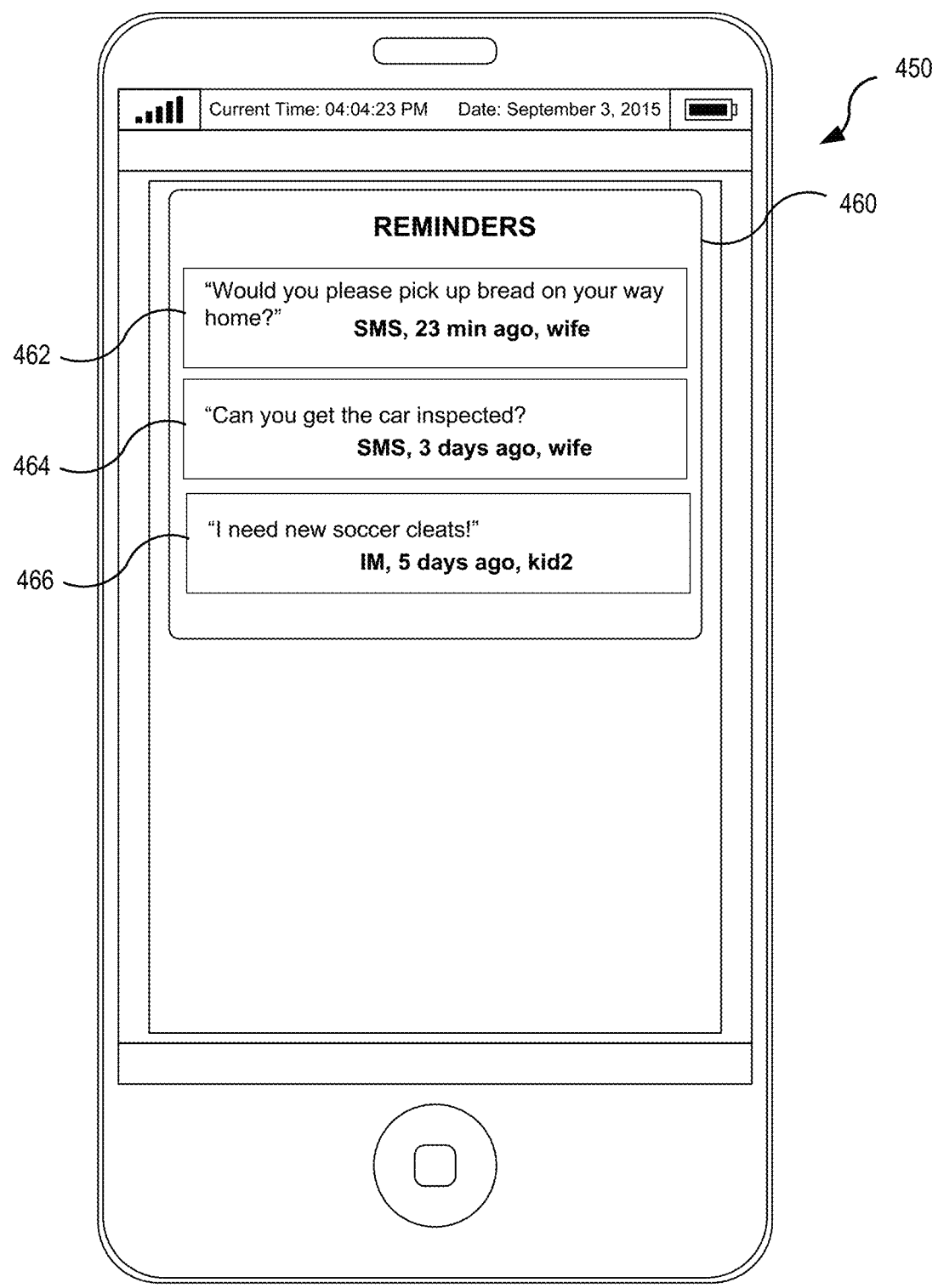

As described herein, the reminder component 230 performs various actions when setting reminders on behalf of users of the mobile device 100. FIGS. 4A to 4B are display diagrams illustrating example user interfaces presented by a mobile device.

FIG. 4A depicts a user interface 400 that displays a virtual keyboard 410 rendered and displayed by the virtual keyboard application 110. In response to classifying a received message 420 as a "task," the reminder component 230 causes the virtual keyboard 410 to display a reminder icon 440 along display automated responses 430. The user may select the reminder icon 440 in order to set a reminder, either via one or more reminder or task applications of the mobile device 100, via a calendar application of the mobile device 100, and so on.

FIG. 4B depicts a user interface 450 that displays a list of set reminders 460 presented by a reminder or task application that are set or initiated by the task reminder system 130. For example, the list of set reminders 460 may include displayed information for reminders 462, 464 set from messages received via the messaging application 140 (e.g., via SMS, or short message service), displayed information for a reminder 466 set from a message received via an instant message application, and so on. Each of the reminders 462, 464, 466 may include various information associated with the message, including the original contents of the message, the time/date at which the message was received, information identifying the application that received the message, the sender of the message, and so on.

Thus, in some embodiments, the systems and methods may access a string of text received by an application of a mobile device, classify the string of text as a task, and perform an action (e.g., set a reminder) that is based on classifying the string of text as a task.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of processing electronic messages, the method comprising:
   providing a virtual keyboard application executable by at least one processor;
   accessing, through the virtual keyboard application, a message received by a messaging application supported by a mobile device;
   parsing, with a natural language understanding system, the message to determine an intent of the message; and
   based on the intent, determining if at least a portion of the message is associated with a task or request, if so, performing an action,
   wherein performing the action includes the keyboard application performing at least one action from the following available actions:
      launching an application associated with setting a reminder on behalf of the user that is associated with the task or request; and
      displaying a user interface element that, when selected by a user of the mobile device, causes the mobile device to automatically display a user interface element associated with setting a reminder on behalf of the user that is associated with the task or request.

2. The method of claim 1, wherein performing an action based on determining the portion of the message is associated with the task or request includes causing the keyboard application to display a user interface element that, when selected by a user of the mobile device, causes the mobile device to display the message to the user.

3. The method of claim 1, further comprising:
generating multiple responses to the task or request, wherein at least one of the generated responses is a response associated with an acceptance of the task or request by a user of the mobile device;
displaying the generated responses to the user of the mobile device via the keyboard application;
receiving a selection of the response associated with an acceptance of the task or request by the user of the mobile device; and
performing the action based on determining the portion of the message is associated with the task or request and based on the selection of the response associated with the acceptance of the task or request by a user of the mobile device.

4. The method of claim 1, wherein determining at least a portion of message is associated with the task or request includes:
performing a natural language understanding analysis on contents of the message; and
assigning a task classifier to the message based on the natural language understanding analysis.

5. The method of claim 1, wherein determining at least a portion of message is associated with the task or request includes:
identifying one or more keywords within the message that are associated with a message including the task or request; and
assigning a task classifier to the message based on the identified keywords.

6. The method of claim 1, wherein accessing a message received by a messaging application supported by a mobile device includes accessing a message received via a text messaging application of the mobile device.

7. The method of claim 1, wherein accessing a message received by a messaging application supported by a mobile device includes accessing a message received via an email application of the mobile device.

8. The method of claim 1, wherein accessing a message received by a messaging application supported by a mobile device includes accessing a message received via an instant messaging application of the mobile device.

9. The method of claim 1, wherein accessing a message received by a messaging application supported by a mobile device includes accessing a message received via a social network service application of the mobile device.

10. An electronic message processing system comprising:
at least one processor and at least one data storage device; and
a virtual keyboard application executable by the at least one processor to process an electronic message, comprising:
a message access component executable to access an electronic message stored by a text input buffer of the keyboard application supported by a mobile device or received by a messaging application supported by the mobile device;
a message classification component executable to task a natural language understanding system to parse the electronic message and assign natural language classifiers to the message based on semantic analyses of the electronic message to determine an intent of the electronic message and to determine if at least a portion of the message is associated with a task or a request; and
a reminder component executable to cause the keyboard application to perform at least one action from the following available actions:
setting a reminder for accessed messages that are assigned one or more natural language classifiers associated with the task or request; and
displaying a user interface element that, when selected by a user of the mobile device, causes the mobile device to automatically display a user interface element associated with setting a reminder on behalf of the user that is associated with the task or request.

11. The system of claim 10, wherein the message classification component is further executable to assign task classifiers to messages stored by the text input buffer or received by the messaging application based on determining the messages include tasks given to recipients of the messages from senders of the messages.

12. The system of claim 10, wherein the message classification component is further executable to assign request classifiers to messages stored by the text input buffer or received by the messaging application based on determining the messages include requests to perform tasks posed to recipients of the messages from senders of the messages.

13. The system of claim 10, wherein the reminder component is further executable to cause the keyboard application to display a user interface element that, when selected by a user of the mobile device, causes the mobile device to launch an application associated with setting a reminder on behalf of the user that is associated with the task or request.

14. The system of claim 10, wherein the reminder component automatically is further executable to display a user interface element associated with setting a reminder on behalf of the user that is associated with the task or request.

15. The system of claim 10, wherein the reminder component is further executable to cause the keyboard application to display a user interface element that, when selected by a user of the mobile device, causes the mobile device to display the message to the user.

16. A method of processing electronic messages, the method comprising:
providing a virtual keyboard application executable by at least one processor, the virtual keyboard application accessing messages received by a plurality of messaging applications of a computing device;
for a message received by one of the plurality of messaging applications, performing semantic and/or natural language understanding analysis of the message, including determining an intent and assigning a classifier to the message based on the intent, by the at least one processor; and
if the classifier indicates that the message is associated with a task or a request, the virtual keyboard application initiating an action responsive to the message,
wherein initiating the action includes causing the virtual keyboard application to perform at least one action from the following available actions:
launching an application associated with setting a reminder on behalf of the user that is associated with the task or request; and
displaying a user interface element that, when selected by a user of the mobile device, causes the mobile device to automatically display a user interface element associated with setting a reminder on behalf of the user that is associated with the task or request.

17. The method of claim 16, wherein if the classifier indicates that the message is associated with a question, the virtual keyboard application initiating a response to the question.

18. The method of claim 16, further comprising:
   generating a user interface displaying a set of reminders associated with different ones of the plurality of messaging applications.

\* \* \* \* \*